United States Patent
Deng et al.

(10) Patent No.: US 8,712,403 B2
(45) Date of Patent: Apr. 29, 2014

(54) METHOD, BASE STATION AND SYSTEM FOR ADJUSTING CELL WIRELESS CONFIGURATION PARAMETER

(75) Inventors: Tianle Deng, Shanghai (CN); Binsong Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 13/330,354

(22) Filed: Dec. 19, 2011

(65) Prior Publication Data

US 2012/0088491 A1   Apr. 12, 2012

Related U.S. Application Data

(63) Continuation of application No. PCT/CN2010/074109, filed on Jun. 19, 2010.

(30) Foreign Application Priority Data

Jun. 19, 2009 (CN) .......................... 2009 1 0139475

(51) Int. Cl.
*H04W 24/00* (2009.01)
(52) U.S. Cl.
USPC ........... 455/424; 455/429; 455/446; 455/466; 455/418; 455/67.11; 370/338
(58) Field of Classification Search
USPC .......................... 455/418, 419, 420, 423, 434, 455/422.1–430, 446–449, 466, 67.11–67.7, 455/115.1; 370/328–338; 379/1.01–35
See application file for complete search history.

(56) References Cited

U.S. PATENT DOCUMENTS

| | | | | |
|---|---|---|---|---|
| 5,570,343 A | * | 10/1996 | Bishop et al. | 370/216 |
| 6,112,081 A | * | 8/2000 | Namura et al. | 455/424 |
| 6,941,347 B2 | * | 9/2005 | Yoshimura | 709/206 |
| 7,583,962 B2 | * | 9/2009 | Nelson et al. | 455/424 |
| 7,783,285 B2 | * | 8/2010 | Chater-Lea | 455/423 |
| 2004/0063455 A1 | | 4/2004 | Eran et al. | |
| 2004/0157613 A1 | * | 8/2004 | Steer et al. | 455/446 |
| 2006/0203746 A1 | * | 9/2006 | Maggenti et al. | 370/254 |
| 2006/0268791 A1 | * | 11/2006 | Cheng et al. | 370/338 |

(Continued)

FOREIGN PATENT DOCUMENTS

| | | |
|---|---|---|
| CN | 1223781 A | 7/1999 |
| CN | 1533200 A | 9/2004 |

(Continued)

OTHER PUBLICATIONS

European Search Report received in European Patent Application No. 10788961.0/2414, mailed Mar. 23, 2012, 10 pages.

(Continued)

*Primary Examiner* — Quan M Hua
(74) *Attorney, Agent, or Firm* — Slater & Matsil, L.L.P.

(57) ABSTRACT

The present disclosure relates to the field of communications technologies, and in particular to a method, a base station and a system for adjusting a cell wireless configuration parameter. The method includes: obtaining system performance information of an adjustment participating cell and a peripheral cell of the adjustment participating cell under different wireless-configuration-related information; and adjusting a wireless configuration parameter of the adjustment participating cell according to the system performance information of the adjustment participating cell and the peripheral cell of the adjustment participating cell.

17 Claims, 7 Drawing Sheets

(56) References Cited

U.S. PATENT DOCUMENTS

| | | | |
|---|---|---|---|
| 2007/0042799 | A1 | 2/2007 | Jubin et al. |
| 2007/0225028 | A1 | 9/2007 | Nelson et al. |
| 2009/0252113 | A1 | 10/2009 | Take |
| 2010/0216453 | A1* | 8/2010 | Kallin et al. ............... 455/424 |

FOREIGN PATENT DOCUMENTS

| | | |
|---|---|---|
| CN | 1553614 A | 12/2004 |
| CN | 1689246 A | 10/2005 |
| CN | 1905745 A | 1/2007 |
| CN | 101313603 A | 11/2008 |
| CN | 101322326 A | 12/2008 |
| EP | 1895801 A1 | 3/2008 |
| EP | 2154918 A1 | 2/2010 |
| WO | WO 2009/078764 A1 | 6/2009 |

OTHER PUBLICATIONS

International Search Report received in Patent Cooperation Treaty Application No. PCT/CN2010/074109, mailed Sep. 30, 2010, 8 pages.

T-Mobile, "Considerations SON Use Case Priorities," 3GPP TSG-RAN WG3#64, R3-091059, San Francisco, California, May 4-8, 2009, 4 pages.

3rd Generation Partnership Project, Technical Specification Group Radio Access Network; Evolved Universal Terrestrial Radio Access Network (E-UTRAN); Self-Configuring and Self-Optimizing Network Use Cases and Solutions (Release 9), 3GPP TR 36.902, v1.2.0, May 2009, 22 pages.

3rd Generation Partnership Project, Technical Specification Group Services and System Aspects; Telecommunications Management; Self-Healing OAM; Concepts and Requirements (Release 9), 3GPP TS 32.541, v0.2.0, May 2009, 16 pages.

Written Opinion of the International Searching Authority received in Patent Cooperation Treaty Application No. PCT/CN2010/074109, mailed Sep. 30, 2010, 10 pages.

Rejection Decision received in Chinese Application No. 200910139475.8, mailed Jun. 4, 2013, 24 pages. (Partial Translation).

$3^{rd}$ Generation Partnership Project; Technical Specification Group Services and System Aspects; Telecommunication management; Study on management of Evolved Universal Terrestrial Radio Access Network (E-UTRAN) and Evolved Packet Core (EPC) (Release 8), 3GPP TR 32.816 V8.0.0, Dec. 2008, 38 pages.

Huawei, "Mapping of 3GPP use cases to NGMN use cases for LTE SON," 3GPP TSG-SA5 (Telecom Management), S5-080822, Meeting SA5#59, Chengdu, China, Apr. 21-25, 2008, 3 pages.

Second Office Action of Chinese Application No. 200910139475.8, mailed Dec. 13, 2012, 20 pages. (Partial Translation).

Search Report of Chinese Application No. 2009101394758, mailed Dec. 4, 2012, 3 pages.

\* cited by examiner

METHOD, BASE STATION AND SYSTEM FOR ADJUSTING CELL WIRELESS CONFIGURATION PARAMETER

CROSS-REFERENCE TO RELATED APPLICATIONS

This application is a continuation of International Application No. PCT/CN2010/074109, filed on Jun. 19, 2010, which claims priority to Chinese Patent Application No. 200910139475.8, filed with the Chinese Patent Office on Jun. 19, 2009 both of which are hereby incorporated by reference in their entireties.

FIELD OF THE INVENTION

The present invention relates to the field of communications technologies, and in particular, to a method, a base station and a system for adjusting a cell wireless configuration parameter.

BACKGROUND OF THE INVENTION

In a mobile communication system constituted by cellular cells, a cell is a communication area of certain coverage that provides services for mobile users. One base station is in charge of several cells, or one eNB may be in charge of one cell. In a Long Term Evolution (Long Term Evolution, LTE) system, a base station is called an evolved Node B (evolved Node B, eNodeB), which is hereinafter referred to as an eNB for short.

A wireless mobile network is currently divided into two parts, namely, a Core Net (Core net, CN) and a Radio Access Network (Radio Access Network, RAN). The RAN performs an access service of a User Equipment (User Equipment, UE), and forwards service data to the CN or forwards service data received from the CN to the UE. In the LTE system, the RAN is constituted by eNBs. FIG. 1 is a structural diagram of the RAN in the LTE system in the prior art.

If some problems occur in the RAN, for example, failure of an eNB power source, failure of a link (S1 link) from the eNB to the CN, failure of a baseband processor of the eNB, failure of an antenna feeder system, or failure of an antenna, these failures may eventually cause deterioration of Quality of Service (QoS) of users in one or more cells, and even cause service interruption so that the users are forced to switch from an active state to an idle state, or a traffic interruption or disconnection occurs. This is often referred to as a cell outage (cell outage). In this scenario, coverage and capacity losses are generally caused.

In the prior art, after it is determined that the cell outage occurs, a network manager calculates, based on a centralized algorithm or a planning tool, wireless parameter configurations of cells that need to be adjusted, and sends the wireless parameter configurations to the cells that need to be adjusted. The cells that need to be adjusted adjust respective configurations according to the wireless parameter configurations, so as to compensate for the coverage or capacity in the area where the problem occurs. Here, the cells that need to be adjusted include an adjustment participating cell and a peripheral cell. The adjustment participating cell refers to a cell which is located on the periphery of a failed cell and compensates for the coverage and capacity losses caused by the failed cell. The peripheral cell refers to a cell adjacent to the adjustment participating cell.

In a process for implementing the present invention, the inventor of the present invention finds that: In the prior art, the RAN needs to collect a large amount of information, and sends the information to the network manager, which increases a backhaul (backhaul) overhead of the network, so that it is rather slow for the system to discover a failure, locate a failed cell, and change a wireless parameter of the cell.

SUMMARY OF THE INVENTION

According to one aspect, the present invention provides a method for adjusting a cell wireless configuration parameter. The method includes: obtaining system performance information of an adjustment participating cell and a peripheral cell of the adjustment participating cell under different wireless-configuration-related information; and adjusting a wireless configuration parameter of the adjustment participating cell according to the system performance information of the adjustment participating cell and the peripheral cell of the adjustment participating cell.

According to another aspect, the present invention provides a base station. The base station includes: an obtaining unit, configured to obtain system performance information of an adjustment participating cell and a peripheral cell of the adjustment participating cell under different wireless-configuration-related information; and an adjusting unit, configured to adjust a wireless configuration parameter of the adjustment participating cell according to the system performance information of the adjustment participating cell and the peripheral cell of the adjustment participating cell.

According to another aspect, the present invention further provides a communication system. The system includes the foregoing base station.

According to the embodiments of the present invention, by analyzing the system performance information of the adjustment participating cell and the system performance information of the peripheral cell of the adjustment participating cell at the adjustment participating cell, a centralized adjustment work load can be decentralized, and an coverage adjustment of the entire system is accelerated.

DETAILED DESCRIPTION OF THE EMBODIMENTS

In order to make the objectives, technical solutions, and advantages of the present invention more clearly, embodiments of the present invention are further described in detail below with reference to the embodiments and the accompanying drawings. Here, the exemplary embodiments of the present invention and descriptions of the exemplary embodiments of the present invention are only intended to explain the present invention, but are not constructed as limitations to the present invention.

The embodiments of the present invention provide a method, a base station and a system for adjusting a cell wireless configuration parameter.

Figure 1:
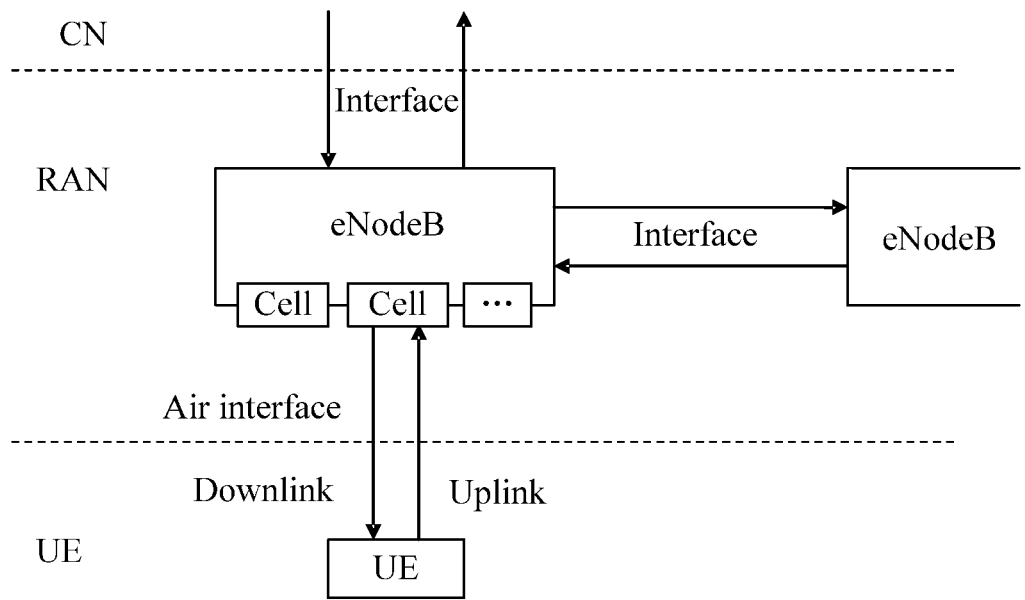
FIG. 1 is a structural diagram of an RAN in the prior art.
Figure 2:
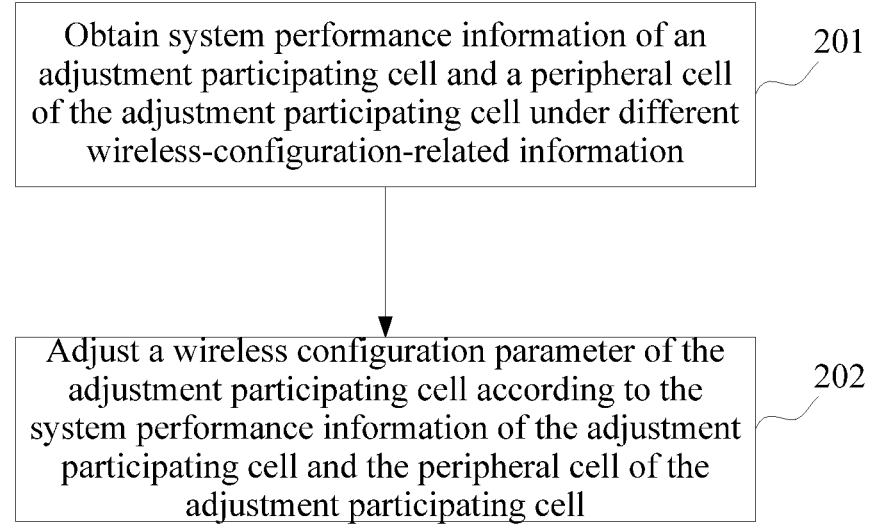
FIG. 2 is a flow chart of an embodiment of a method for adjusting a cell wireless configuration parameter according to an embodiment of the present invention.

FIG. 2 is a flow chart of an embodiment of a method for adjusting a cell wireless configuration parameter according to an embodiment of the present invention. The method specifically includes the following content.

201: Obtain system performance information of an adjustment participating cell and a peripheral cell of the adjustment participating cell under different wireless-configuration-related information.

The wireless-configuration-related information includes a wireless configuration number and/or a wireless configuration parameter; and the wireless configuration parameter includes at least one piece of the following information: parameters such as transmitting power of an antenna, an antenna downtilt angle, and an antenna azimuth angle. The system performance information includes at least one piece of the following information: a throughput rate, a capacity, an average channel capacity, coverage, and QoS.

202: Adjust a wireless configuration parameter of the adjustment participating cell according to the system performance information of the adjustment participating cell and the peripheral cell of the adjustment participating cell.

As an embodiment of the present invention, in the foregoing step 201, the peripheral cell transfers the system performance information of the peripheral cell under the different wireless-configuration-related information to the adjustment participating cell. The peripheral cell obtains the system performance information of the peripheral cell under the different wireless-configuration-related information of the adjustment participating cell by using history measurement information of the peripheral cell, and geographical information of the corresponding adjustment participating cell, antenna height of the corresponding adjustment participating cell, an antenna downtilt angle of the corresponding adjustment participating cell, and an antenna azimuth angle of the corresponding adjustment participating cell. The geographical information includes station address information, and may also include a channel model and/or cell shape and size. The adjustment participating cell may transfer the different wireless configuration parameters to the peripheral cell of the adjustment participating cell, and the peripheral cell may calculate the system performance of the peripheral cell according to a transfer sequence of the adjustment participating cell, so that the peripheral cell may match the system performance with the wireless configuration number when transferring the system performance. As an alternative embodiment, the wireless configuration number may be sent when the different wireless configuration parameters are sent by the adjustment participating cell, so as to notify the peripheral cell that which wireless-configuration-related information matches with the currently-calculated system performance.

As another embodiment of the present invention, in the foregoing step 201, the adjustment participating cell obtains the history measurement information at each geographical location in the peripheral cell and the geographical information of the peripheral cell, and according to the history measurement information at each geographical location in the peripheral cell and the geographical information of the peripheral cell, and the history measurement information at each geographical location in the adjustment participating cell and the geographical information of the adjustment participating cell, the adjustment participating cell obtains the system performance information of the peripheral cell under the different wireless-configuration-related information of the corresponding adjustment participating cell.

As an embodiment of the present invention, before the foregoing step 202, the method further includes: exchanging the system performance information of the adjustment participating cells and the system performance information of the peripheral cells of the adjustment participating cells between the adjustment participating cells. Specifically, the system performance information of the adjustment participating cells and the system performance information of the peripheral cells of the adjustment participating cells may be combined into total system performance information, and the total system performance information is exchanged between the adjustment participating cells.

As another embodiment of the present invention, the foregoing step 202 may specifically include: when the system performance information of the adjustment participating cell and the system performance information of the peripheral cell of the adjustment participating cell are greater than or equal to a set value after an operation, adjusting the wireless configuration parameter of the adjustment participating cell according to the current corresponding wireless-configuration-related information; or obtaining wireless-configuration-related information corresponding to the maximum system performance by comparing the total system performance of all the adjustment participating cells and the peripheral cells of all the adjustment participating cells under the different wireless-configuration-related information, and adjusting the wireless configuration parameter of the adjustment participating cell according to the current wireless-configuration-related information. The operation includes: adding a throughput rate of the adjustment participating cell to a throughput rate of the peripheral cell of the adjustment participating cell; or adding a capacity of the adjustment participating cell to a capacity of the peripheral cell of the adjustment participating cell. The capacity includes a channel capacity or a user capacity.

According to the foregoing embodiments, the adjustment participating cell may perform a calculation to decentralize a calculation work load, so that compared with a centralized processing mode, an adjustment speed is fast and a line overhead is low.

Figure 3:
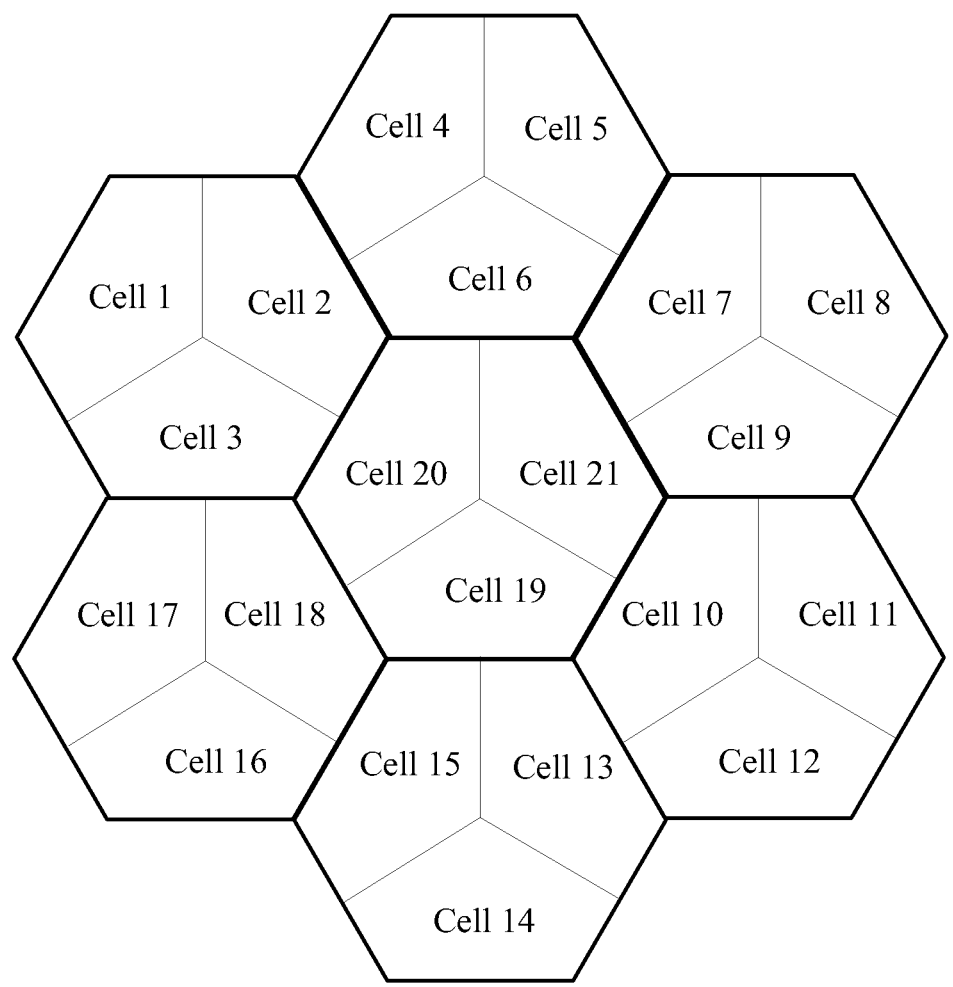
FIG. 3 is a cell coverage diagram according to an embodiment of the present invention.

FIG. 3 is a cell coverage diagram according to an embodiment of the present invention. Each cell may have one eNB, or three cells may share one eNB as shown in FIG. 3. In the following embodiments, each cell having one eNB is taken as an example for description.

Figure 4A:
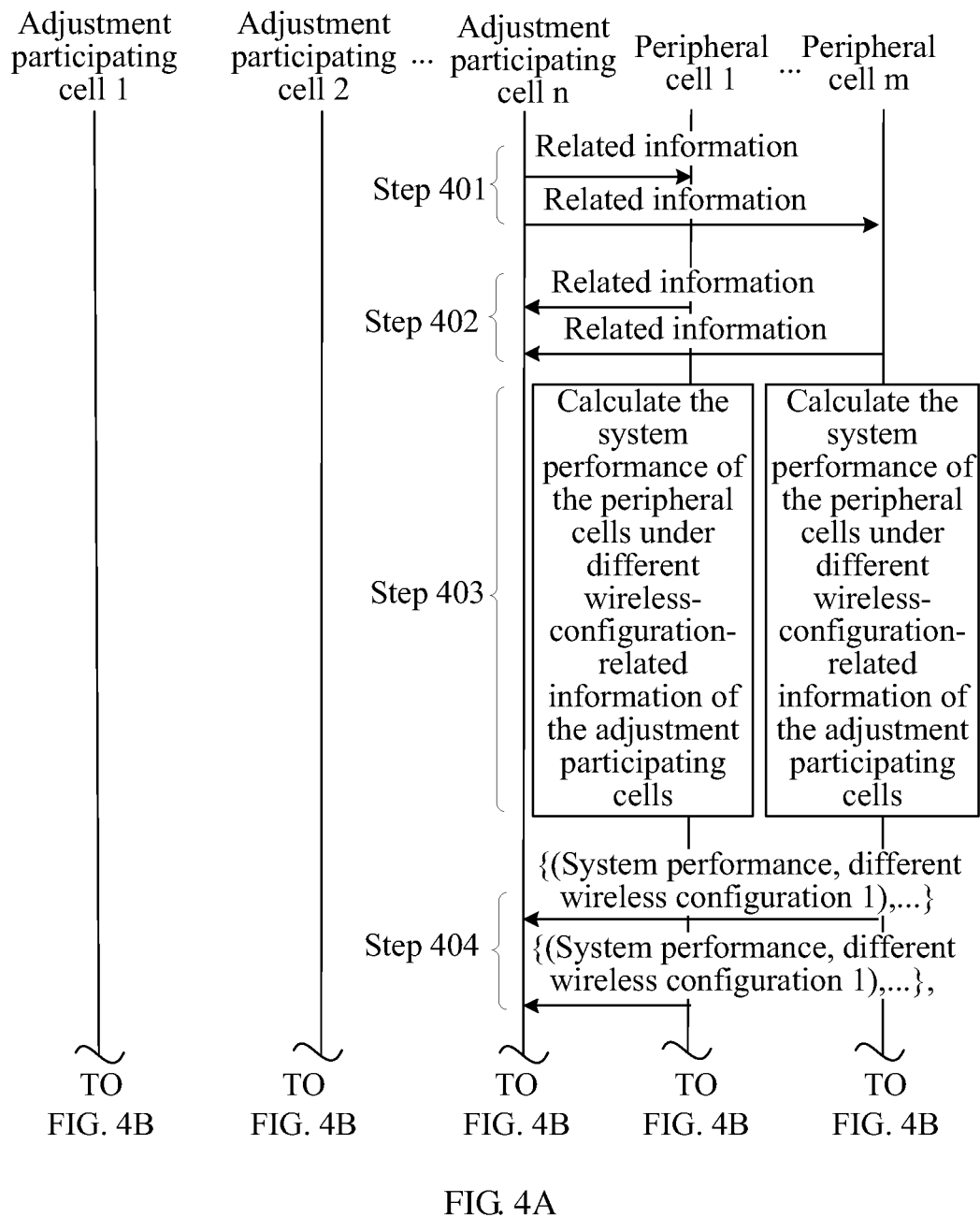
FIGS. 4A and 4B are data flow diagrams of an embodiment of a method for adjusting a cell wireless configuration parameter according to an embodiment of the present invention.
Figure 4B:
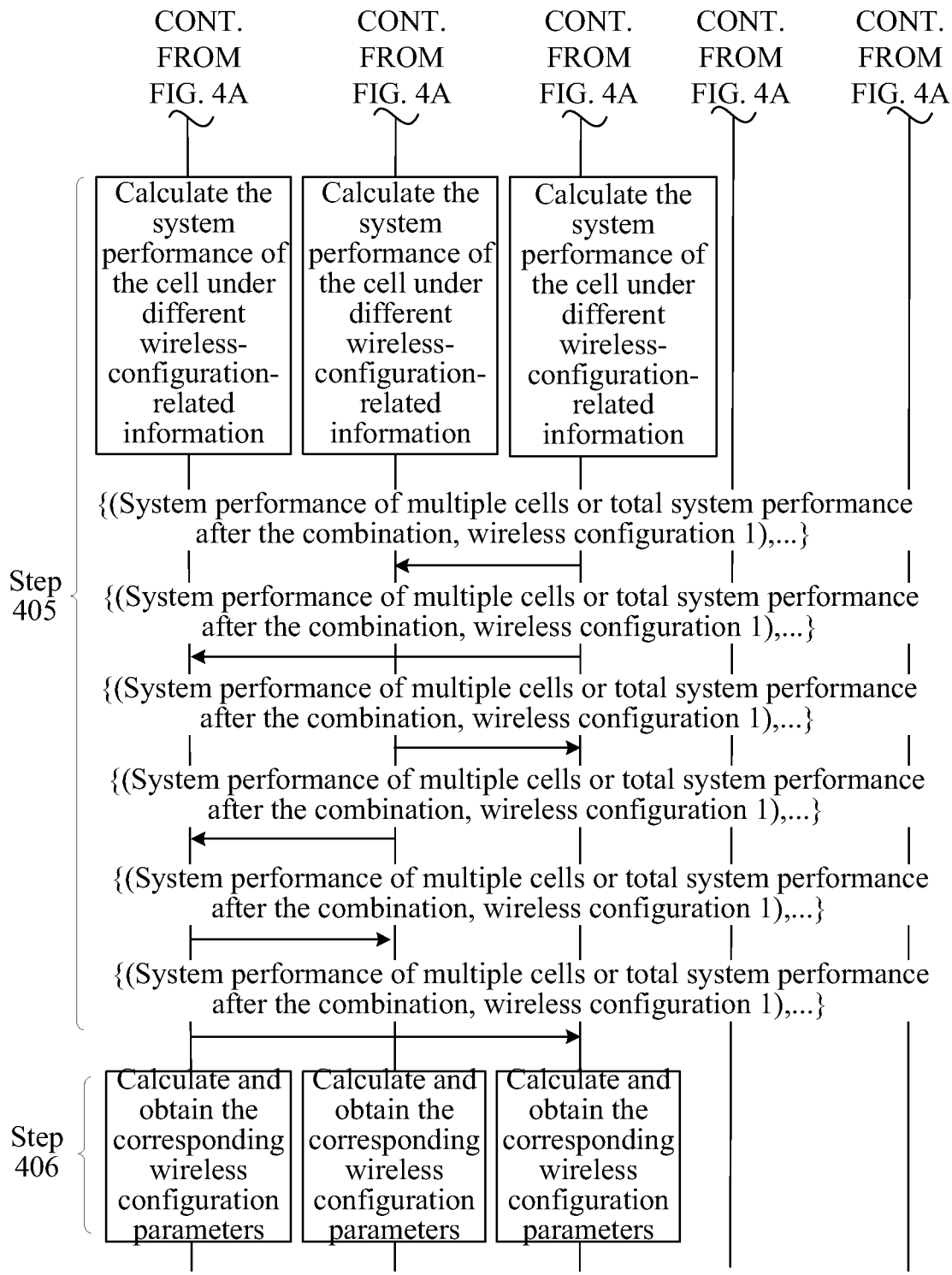

FIGS. 4A and 4B are data flow diagrams of an embodiment of a method for adjusting a cell wireless configuration parameter according to an embodiment of the present invention. In this embodiment, referring to FIG. 3, for example, a cell 20 fails, and corresponding adjustment participating cells include: a cell 6, cell 2, cell 3, cell 18, cell 19, and cell 21, where peripheral cells of the cell 6 include: a cell 4, cell 5, and cell 7; peripheral cells of the cell 2 include: a cell 1 and the cell 4; peripheral cells of the cell 3 include: the cell 1 and cell 17; peripheral cells of the cell 18 include: a cell 15, cell 16, and the cell 17; peripheral cells of the cell 19 include: a cell 10, cell 13, and the cell 15; and peripheral cells of the cell 21 include the cell 7, a cell 9, and the cell 10. As shown in FIGS.

4A and 4B, the method provided in this embodiment specifically includes the following content.

401: Peripheral cells of adjustment participating cells obtain related information of the adjustment participating cells.

The related information of the adjustment participating cells includes geographical information of the adjustment participating cells and current wireless-configuration-related information of the adjustment participating cells; and the geographical information includes station address information (location). Optionally, the geographical information may also include a channel model and/or cell shape and size. For example, the peripheral cells 10, 13, and 15 of the adjustment participating cell 19 respectively obtain geographical information of the cell 19.

Optionally, the peripheral cells may store matching relations between wireless configuration numbers of the adjustment participating cells and wireless configuration parameters of the adjustment participating cells, so that the peripheral cells may obtain current wireless configuration numbers of the adjustment participating cells, and then obtain wireless configuration parameters corresponding to the wireless configuration numbers by matching; or the peripheral cells may obtain the wireless configuration parameters of the adjustment participating cells, and then obtain the wireless configuration numbers corresponding to the wireless configuration parameters by matching.

402: The peripheral cells of the adjustment participating cells send related information of the peripheral cells to the adjustment participating cells. The related information of the peripheral cells includes geographical information of the peripheral cells and wireless-configuration-related information of the peripheral cells, and may also include history measurement information at each geographical location in the peripheral cells. The geographical information of the peripheral cells includes station address information (location), and may also include a channel model and/or cell shape and size. The history measurement information at each geographical location in the peripheral cells includes path loss, and may also include at least one of interference information and signal quality. For example, the peripheral cells 10, 13, and 15 respectively send the geographical information of the peripheral cells and the history measurement information at each geographical location in the peripheral cells to the corresponding adjustment participating cell 19. It should be noted that, step 402 may be performed at any time before step 405, and may not necessarily be performed between step 401 and step 403.

403: The peripheral cells of the adjustment participating cells calculate (for example, calculate through a simulation method) and obtain the system performance information (including at least one piece of the following information: a throughput rate, an average channel capacity, coverage, and QoS) of the peripheral cells under different wireless-configuration-related information of the adjustment participating cells, based on the history measurement information at each geographical location in the peripheral cells and the geographical information of the adjustment participating cells. For example, the peripheral cells 10, 13, and 15 respectively calculate the system performance when the adjustment participating cell 19 corresponding to the peripheral cells 10, 13, and 15 is under the different wireless-configuration-related information. The history measurement information at each geographical location in the peripheral cells may include path loss of each geographical location, and may also include at least one of interference information and signal quality, where the signal quality includes, for example, a Signal to Noise Ratio (SNR).

404: The peripheral cells of the adjustment participating cells feed back at least one piece of the system performance information to the adjustment participating cells. For example, the peripheral cells 10, 13, and 15 respectively transfer the multiple pieces of system performance information obtained in the foregoing step 403 to the adjustment participating cell 19. When the system performance information of the peripheral cells under the different wireless-configuration-related information of the corresponding adjustment participating cells is transferred to the adjustment participating cells, the peripheral cells may also transfer different wireless configuration parameters and/or different wireless configuration numbers, where the different wireless configuration parameters and/or different wireless configuration numbers correspond to the different system performance information, to the adjustment participating cells, where the wireless configuration parameters include at least one piece of the following information: transmitting power of an antenna, an antenna azimuth angle, and an antenna downtilt angle, so that the adjustment participating cells may know the specific wireless configuration serial number under which the system performance transferred from the peripheral cells is.

405: The adjustment participating cells calculate (including a simulation calculation method) and obtain the system performance information of the adjustment participating cells under the different wireless-configuration-related information of the adjustment participating cells, based on the history measurement information at each geographical location in the adjustment participating cells and the history measurement information at each geographical location in the peripheral cells of the adjustment participating cells. The adjustment participating cells exchange the system performance information of the adjustment participating cells under the wireless-configuration-related information and the system performance information of the multiple peripheral cells of the adjustment participating cells with the system performance information of the other adjustment participating cells; or combine the performance information of the multiple cells under the wireless-configuration-related information into total system performance information, and then exchange the system performance information with the other adjustment participating cells. During the exchanging of the system performance information between the adjustment participating cells, the different wireless configuration numbers and/or different wireless configuration parameters, where the different wireless configuration numbers and/or different wireless configuration parameters correspond to the different system performance, may also be exchanged, so that the adjustment participating cells may know the wireless configuration serial number corresponding to the currently-exchanged system performance.

For example, the adjustment participating cell 19 calculates the system performance information of the cell 19 under different wireless-configuration-related information, and exchanges the system performance information of the cell 19 under all the wireless-configuration-related information and the system performance information of the peripheral cells 10, 13, and 15 under the wireless-configuration-related information with the system performance information of the adjustment participating cells 6, 2, 3, 18, and 21. Alternatively, the adjustment participating cell 19 adds the system performance information of the cell 19 under certain wireless-configuration-related information to the system performance information of the peripheral cells of the adjustment participating cells. For example, the cell 19 adds a throughput rate of the cell 19 under certain wireless-configuration-related information to throughput rates of the peripheral cells 10, 13, and 15 under the wireless-configuration-related information, and then exchanges the total throughput rate under the wireless-configuration-related information with the throughput rates of the other adjustment participating cells.

406: All the adjustment participating cells analyze the exchanged system performance information. When the system performance information of all the adjustment participating cells and the peripheral cells of all the adjustment participating cells is greater than or equal to a threshold after a calculation, each adjustment participating cell adopts the currently corresponding wireless-configuration-related information to adjust the wireless configuration parameters of the adjustment participating cell, where each adjustment participating cell has the currently corresponding wireless-configuration-related information. Alternatively, the system performance information of all the adjustment participating cells and the peripheral cells of all the adjustment participating cells after calculation are compared with the total system performance of all the adjustment participating cells and the peripheral cells of all the adjustment participating cells under the different wireless-configuration-related information, to obtain wireless-configuration-related information corresponding to the maximum system performance, so that each adjustment participating cell adopts the wireless-configuration-related information corresponding to the maximum system performance to adjust the wireless configuration parameters of the adjustment participating cell. All the adjustment participating cells exchange the wireless-configuration-related information, then feed back the final wireless-configuration-related information to each other, and adopt the wireless configuration parameters corresponding to the final wireless-configuration-related information to adjust the wireless configuration parameters of the adjustment participating cells.

For example, the adjustment participating cell 19 obtains the system performance information of the other adjustment participating cells and the peripheral cells of the other adjustment participating cells under all the wireless-configuration-related information, and adds (or adopts another operation) channel capacities of the adjustment participating cells and the corresponding peripheral cells of the adjustment participating cells under different wireless-configuration-related information. If the sum of the channel capacities is greater than a threshold (or a maximum sum is adopted), the adjustment participating cell 19 adjusts the wireless configuration parameters of the cell 19 according to the corresponding wireless-configuration-related information. The other adjustment participating cells may also adopt the foregoing method to obtain the wireless configuration parameters. Optionally, the adjustment participating cell 19 may transfer the wireless-configuration-related information of the other adjustment participating cells to the other adjustment participating cells, when the sum of the channel capacities is greater than the threshold.

The system performance information of all the adjustment participating cells and the peripheral cells of all the adjustment participating cells after calculation are compared with the total system performance of all the adjustment participating cells and the peripheral cells of all the adjustment participating cells under the different wireless-configuration-related information. For example, the total system performance of the adjustment participating cell 19 and the peripheral cells of the adjustment participating cell 19 under certain wireless-configuration-related information is added to the total system performance of another adjustment participating cell 21 and the peripheral cells of the adjustment participating cell 21 under certain wireless-configuration-related information, and after the total system performance of all the adjustment participating cells and the peripheral cells of all the adjustment participating cells under certain wireless-configuration-related information is added up, assumed system performance is obtained. The assumed system performance under different wireless-configuration-related information is compared to obtain wireless-configuration-related information corresponding to maximum assumed system performance. All the adjustment participating cells adopt the wireless-configuration-related information corresponding to the maximum assumed system performance to adjust the wireless configuration parameters of the adjustment participating cells. Specifically, the adjustment participating cells may obtain corresponding wireless configuration parameters by using the numbers in the wireless-configuration-related information by matching, and adjust the wireless configuration parameters of the adjustment participating cells by using the wireless configuration parameters.

The calculation of the system performance information includes a calculation of the throughput rate, a calculation of the user capacity, and also includes a calculation of the coverage area. For example, the coverage areas of the adjustment participating cells and the peripheral cells of the adjustment participating cells under certain wireless-configuration-related information of the adjustment participating cells are added to the coverage areas of the other adjustment participating cells and the peripheral cells of the other adjustment participating cells under certain wireless-configuration-related information of the adjustment participating cells, to obtain an assumed coverage area. The total system performance of all the adjustment participating cells and the peripheral cells of all the adjustment participating cells under different wireless-configuration-related information is compared, for example, the assumed coverage areas under different wireless-configuration-related information are compared to obtain the wireless-configuration-related information corresponding to the maximum assumed coverage area, and the adjustment participating cells adjust the wireless configuration parameters of the adjustment participating cells according to the wireless-configuration-related information.

According to the foregoing embodiment, the calculation may be performed by the adjustment participating cells and the peripheral cells of the adjustment participating cells, and the system performance between the adjustment participating cells is balanced to decentralize a calculation work load, so that compared with a centralized processing mode, an adjustment speed is fast and a line overhead is low.

Figure 5:
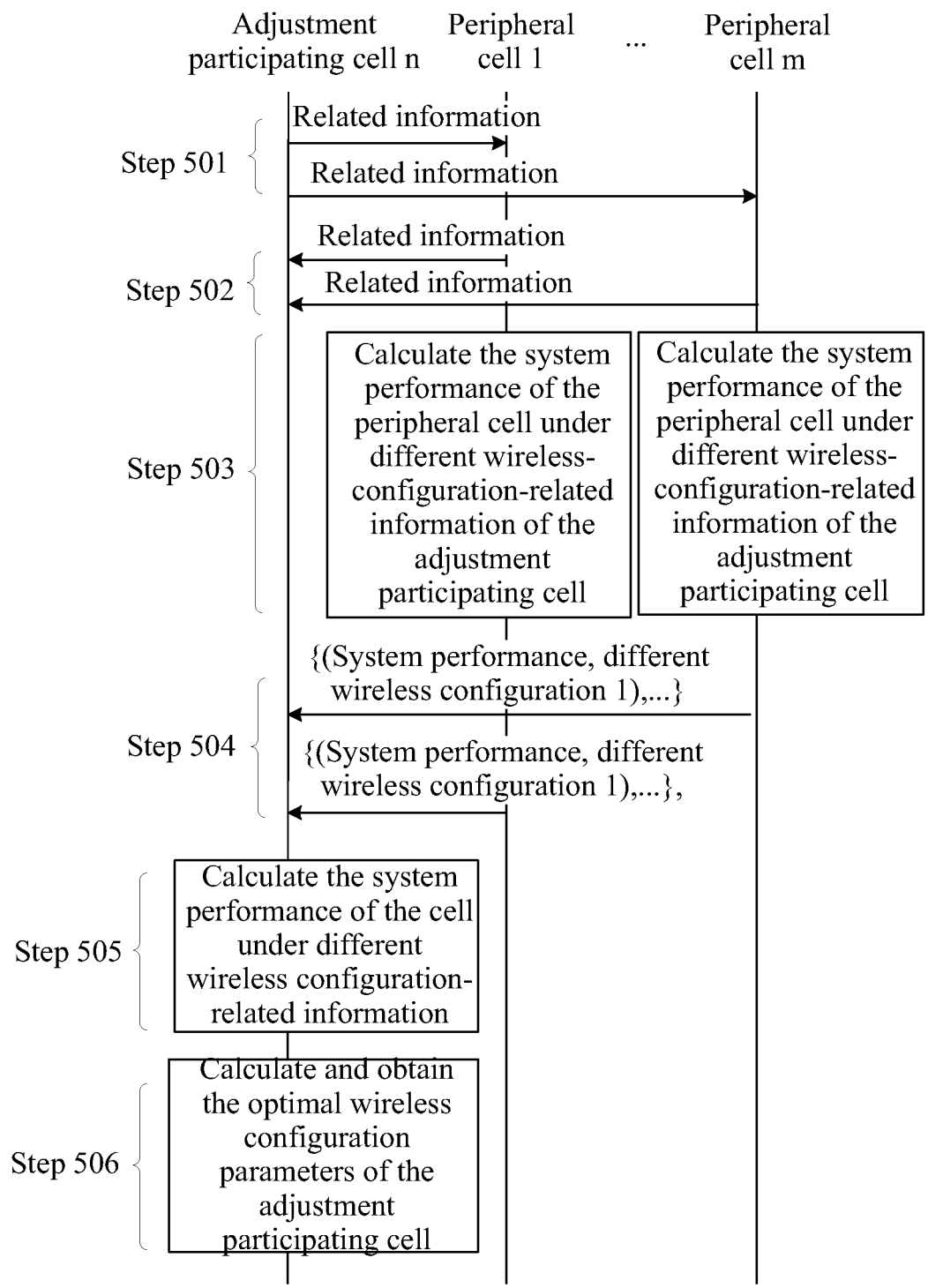
FIG. 5 is a data flow diagram of another embodiment of a method for adjusting a cell wireless configuration parameter according to an embodiment of the present invention.

FIG. 5 is a data flow diagram of another embodiment of a method for adjusting a cell wireless configuration parameter according to an embodiment of the present invention. This embodiment is substantially the same as the embodiment shown in FIGS. 4A and 4B, so only the differences are described in the following and the same parts are not repeatedly described here. In this embodiment, only one adjustment participating cell exists. The method provided in this embodiment specifically includes the following content.

Steps 501 to 504 are the same as steps 401 to 404, and are not repeatedly described here.

505: The adjustment participating cell calculates (including a simulation calculation) and obtains the system performance information of the cell under the different wireless-configuration-related information of the cell based on the history measurement information at each geographical location in the cell and the peripheral cells of the adjustment participating cell.

506: When the system performance information of the adjustment participating cell and the peripheral cells of the adjustment participating cell under the different wireless-configuration-related information is greater than or equal to a threshold value after a calculation, the adjustment participating cell adopts the currently corresponding wireless-configuration-related information to adjust the wireless configuration parameters of the adjustment participating cell. Alternatively, the system performance information of the adjustment participating cell and the peripheral cells of the adjustment participating cell under the different wireless-configuration-related information is compared, to obtain wireless-configuration-related information corresponding to the maximum system performance information, and the wireless-configuration-related information is adopted to adjust the wireless configuration parameters of the adjustment participating cell.

For example, the adjustment participating cell 19 obtains the system performance information of the peripheral cells of the adjustment participating cell 19 under all the wireless-configuration-related information, and adds (or adopts another operation) channel capacities of the adjustment participating cell and the peripheral cells of the adjustment participating cell under different wireless-configuration-related information. If the sum is greater than a threshold value (or a maximum sum is adopted), the adjustment participating cell 19 adjusts the wireless configuration parameters of the adjustment participating cell 19 according to the corresponding wireless-configuration-related information. The calculation of the system performance information may include a calculation of a throughput rate, a calculation of a user capacity, and may also include a calculation of a coverage area. For example, user capacities of the adjustment participating cell and the peripheral cells of the adjustment participating cell under certain wireless-configuration-related information of the adjustment participating cell are compared with user capacities of the adjustment participating cell and the peripheral cells of the adjustment participating cell under certain wireless-configuration-related information, to obtain the wireless-configuration-related information corresponding to the maximum user capacity, and the adjustment participating cell adjusts the wireless configuration parameters of the adjustment participating cell according to the wireless-configuration-related information.

According to the foregoing embodiment, the calculation may be performed by the adjustment participating cell and the peripheral cells of the adjustment participating cell, and the system performance between the adjustment participating cells is balanced to decentralize a calculation work load, so that compared with a centralized processing mode, an adjustment speed is fast and a line overhead is low.

Figure 6:
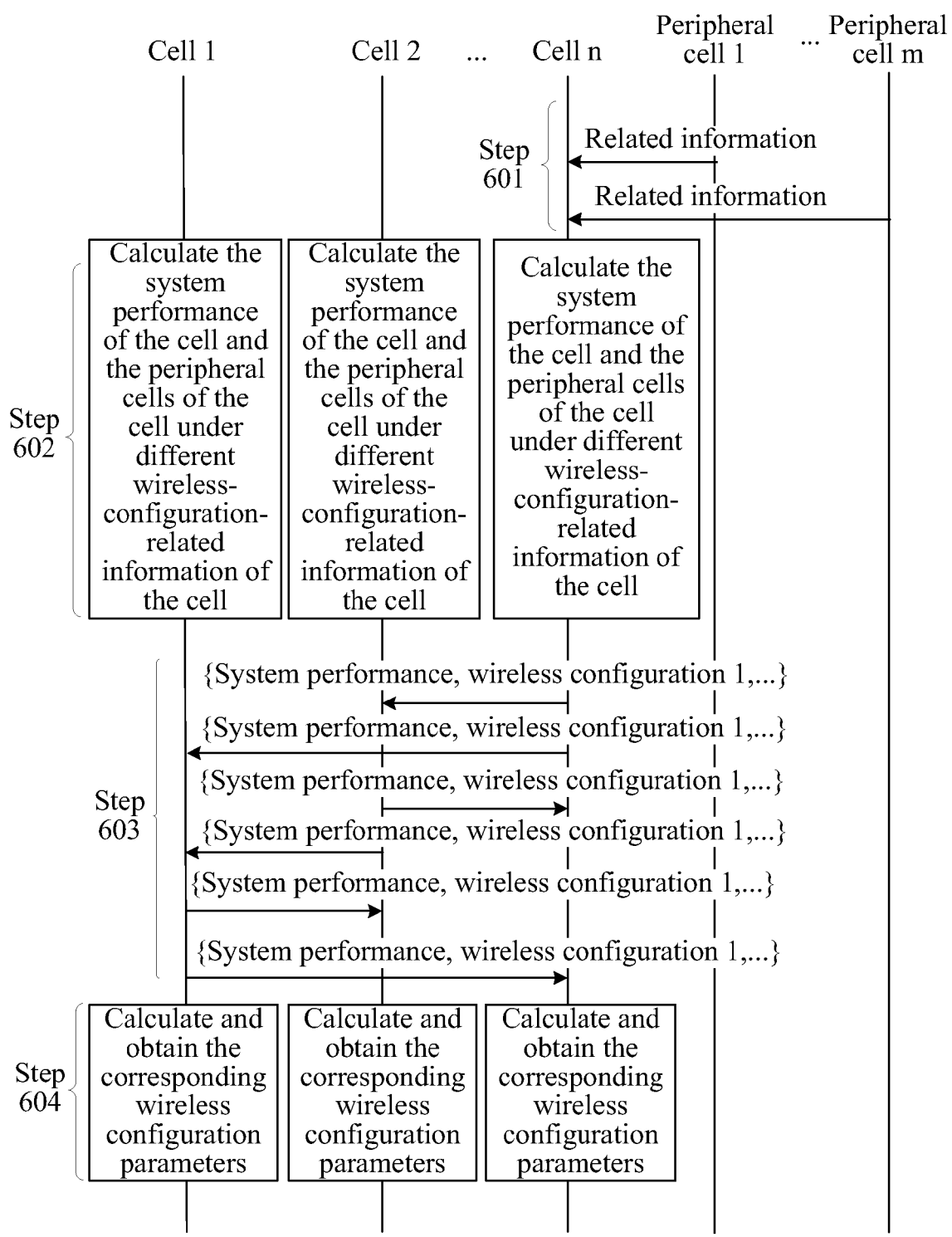
FIG. 6 is a data flow diagram of another embodiment of a method for adjusting cell wireless configuration parameters according to an embodiment of the present invention.

FIG. 6 is a data flow diagram of another embodiment of a method for adjusting cell wireless configuration parameters according to an embodiment of the present invention. The method provided in the embodiments specifically includes the following content.

601: Peripheral cells send related information of the peripheral cells to corresponding adjustment participating cells. The related information of the peripheral cells includes geographical information and wireless-configuration-related information; and may also include history measurement information at each geographical location in the peripheral cells. The geographical information includes station address information (location), and may also include a channel model and/or cell shape and size. The history measurement information at each geographical location in the peripheral cells includes path loss, and may also include interference information and/or signal quality.

For example, peripheral cells 10, 13, and 15 respectively transfer geographical information of the peripheral cells 10, 13, and 15 to an adjustment participating cell 19.

602: The adjustment participating cells calculate (including a simulation calculation) and obtain the system performance information of the adjustment participating cells and the peripheral cells of the adjustment participating cells under the different wireless-configuration-related information of the adjustment participating cells, based on the geographical information of the adjustment participating cells, the geographical information of the peripheral cells of the adjustment participating cells, and the wireless-configuration-related information of the peripheral cells of the adjustment participating cells. Optionally, in order to calculate (including through a simulation calculation) the system performance information more accurately, the adjustment participating cells may also take into account the history measurement information at each geographical location in the adjustment participating cells and/or the history measurement information at each geographical location in the peripheral cells.

603: The adjustment participating cells exchange the system performance information of the adjustment participating cells and the system performance information of the peripheral cells of the adjustment participating cells with the system performance information of the other adjustment participating cells; or combine the system performance of multiple cells into total system performance information, and then exchange the total system performance information with the other adjustment participating cells.

604: Based on the system performance information, if the system performance of all the adjustment participating cells and the peripheral cells of all the adjustment participating cells is greater than or equal to a threshold after calculation, all the adjustment participating cells adopt the currently corresponding wireless-configuration-related information to adjust the wireless configuration parameters of the adjustment participating cells.

According to the foregoing embodiment, the calculation may be performed by the adjustment participating cells, and the system performance between the adjustment participating cells is balanced to decentralize a calculation work load, so that compared with a centralized processing mode, an adjustment speed is fast and a line overhead is low.

Figure 7:
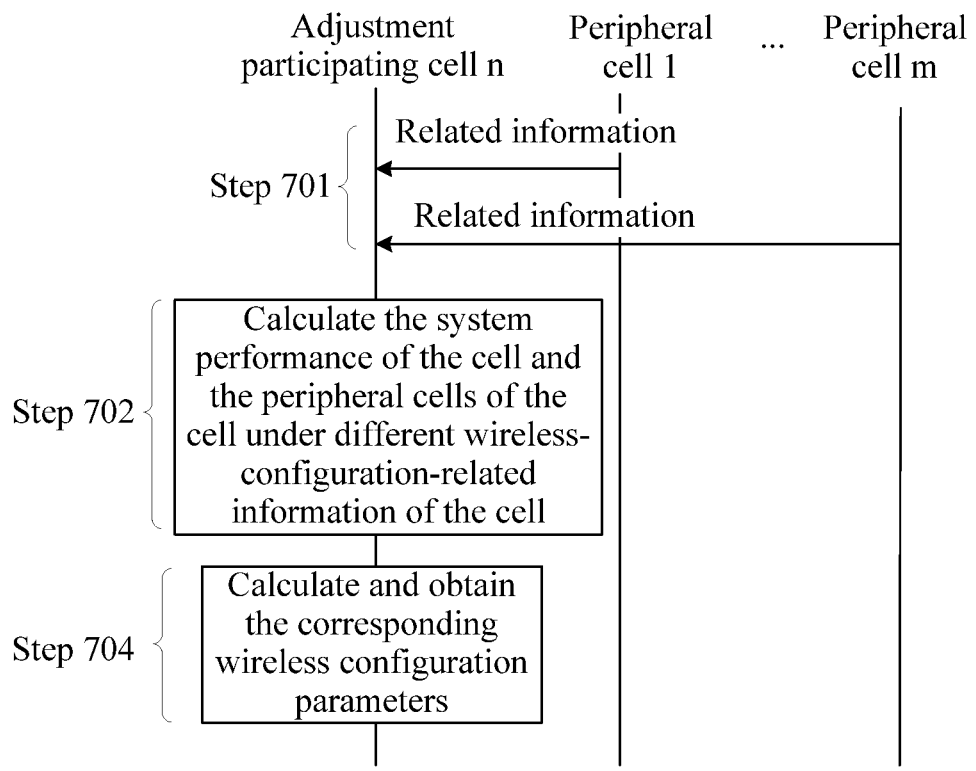
FIG. 7 is a data flow diagram of another embodiment of a method for adjusting cell wireless configuration parameters according to an embodiment of the present invention.

FIG. 7 is a data flow diagram of another embodiment of a method for adjusting cell wireless configuration parameters according to an embodiment of the present invention. In this embodiment, only one adjustment participating cell exists in the embodiment. The method provided in this embodiment specifically includes the following content.

701: Peripheral cells send related information of the peripheral cells to the corresponding adjustment participating cell. The related information of the peripheral cells includes geographical information and wireless-configuration-related information; and may also include history measurement information at each geographical location in the peripheral cells. The geographical information includes station address information (location), and may also include a channel model and/or cell shape and size. The history measurement information at each geographical location in the peripheral cells includes path loss, and may also include at least one of interference information and signal quality.

For example, peripheral cells 10, 13, and 15 respectively transfer geographical information of the peripheral cells 10, 13, and 15 to an adjustment participating cell 19.

702: The adjustment participating cell calculates (including a simulation calculation) and obtain the system performance information of the adjustment participating cell and the peripheral cells of the adjustment participating cell under the different wireless-configuration-related information of the adjustment participating cell, based on the geographical information of the adjustment participating cell, the geographical information of the peripheral cells of the adjustment participating cell, and the wireless-configuration-related information of the peripheral cells of the adjustment participating cell. Optionally, in order to calculate (including a simulation calculation) the system performance information more accurately, the adjustment participating cell may also take into account the history measurement information at each geographical location in the adjustment participating cell and/or the history measurement information at each geographical location in the peripheral cells during the calculation or simulation.

704: Based on the system performance information, if the system performance of the adjustment participating cell and the peripheral cells of the adjustment participating cell is greater than or equal to a threshold value after calculation, the adjustment participating cell adopts the currently corresponding wireless-configuration-related information to adjust the wireless configuration parameters of the adjustment participating cell.

The method provided in the embodiment of the present invention may use an idle time period of cell operation resources, and a heavy calculation work load is avoided when demands on the coverage, capacity, or QoS are raised, thus greatly improving utilization of the cell operation resources and reducing a cost required by a centralized node.

Figure 8:
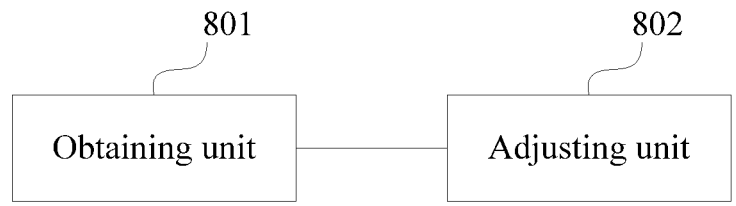
FIG. 8 is a schematic structural diagram of an eNB according to an embodiment of the present invention.

FIG. 8 is a schematic structural diagram of an eNB according to an embodiment of the present invention. Referring to FIG. 8, the eNB provided in this embodiment includes an obtaining unit 801 and an adjusting unit 802. The obtaining unit 801 is configured to obtain system performance information of an adjustment participating cell and a peripheral cell of the adjustment participating cell under different wireless-configuration-related information. The adjusting unit 802 is configured to adjust a wireless configuration parameter of the adjustment participating cell according to the system performance information of the adjustment participating cell and the peripheral cell of the adjustment participating cell.

The eNB provided in this embodiment may calculate the wireless-configuration-related information respectively, thus avoiding disadvantages that resource consumption is high and a speed is slow during centralized processing.

Figure 9:
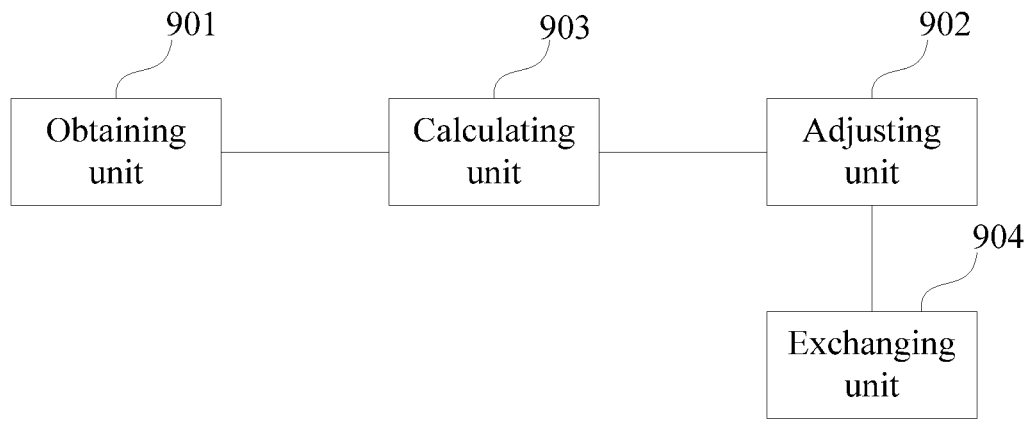
FIG. 9 is another schematic structural diagram of an eNB according to an embodiment of the present invention.

FIG. 9 is another schematic structural diagram of an eNB according to an embodiment of the present invention. Referring to FIG. 9, the eNB provided in this embodiment includes an obtaining unit 901 and an adjusting unit 902. The obtaining unit 901 is configured to obtain system performance information of an adjustment participating cell and a peripheral cell of the adjustment participating cell under different wireless-configuration-related information. Optionally, the obtaining unit is further configured to obtain system performance information of the peripheral cell under the different wireless-configuration-related information of the adjustment participating cell from the eNB corresponding to the peripheral cell. The adjusting unit 902 is configured to adjust a wireless configuration parameter of the adjustment participating cell according to the system performance information of the adjustment participating cell and the peripheral cell of the adjustment participating cell.

Optionally, the eNB also includes a calculating unit 903, which is connected between the obtaining unit 901 and the adjusting unit 902, and configured to calculate the system performance information of the peripheral cell.

Optionally, the eNB also includes an exchanging unit 904, which is connected to the adjusting unit 902, and configured to exchange the system performance information of the adjustment participating cells and the peripheral cells of the adjustment participating cells between the adjustment participating cells.

Optionally, the adjusting unit 902 of the eNB is further configured to perform an operation on the system performance information of the adjustment participating cells and the system performance information of the peripheral cells of the adjustment participating cells, and when total system performance of all the adjustment participating cells and the peripheral cells of all the adjustment participating cells exceeds a set value, adjust the wireless configuration parameters of the adjustment participating cells according to the current corresponding wireless-configuration-related information; or obtain a wireless configuration parameter corresponding to maximum system performance by comparing the total system performance of all the adjustment participating cells and the peripheral cells of all the adjustment participating cells under the different wireless-configuration-related information, and adjust the wireless configuration parameter of the adjustment participating cell according to the wireless-configuration-related information corresponding to the maximum system performance.

In a specific implementation process, an eNB of the adjustment participating cell obtains geographical information of the peripheral cells and history measurement information at each geographical location in the peripheral cells (including path loss, and also including at least one of interference information and signal quality) through the obtaining unit 901. For example, peripheral cells 10, 13, and 15 respectively send the geographical information of the peripheral cells and the related history measurement information at each geographical location in the peripheral cells to a corresponding adjustment participating cell 19. Alternatively, the eNB of the adjustment participating cell obtains the system performance information of the peripheral cells under the different wireless-configuration-related information of the adjustment participating cell through the obtaining unit 901. For example, the adjustment participating cell 19 obtains multiple pieces of system performance information of the peripheral cells 10, 13, and 15.

Optionally, the eNB of the adjustment participating cell may also calculate the system performance of the adjustment participating cell and the peripheral cell of the adjustment participating cell under the different wireless-configuration-related information through the calculating unit 903.

An embodiment of the present invention also provides a communication system, where the communication system includes the eNB provided in the foregoing embodiment.

Through the technical solutions provided in the embodiments of the present invention, the wireless coverage, service capacity, and QoS assurance are provided for a geographical area, and a distribution mode is adopted for implementation instead of using a centralized node. Therefore, the wireless configuration parameter of the cell can be adjusted in real time with a small time delay. The method provided in the embodiment of the present invention may use an idle time period of the cell operation resources, and a heavy calculation work load is avoided when demands on the coverage, capacity, or QoS are raised, thus greatly improving the utilization of the cell operation resources and reducing the cost required by the centralized node. Besides, the cell is used to process and calculate the history measurement information to obtain the system performance information, and the system performance information is exchanged between networks, thus reducing a backhaul overhead of the network.

Through the foregoing description of the implementations, persons skilled in the art may clearly understand that the present invention may be accomplished through hardware, or through software plus a necessary universal hardware platform. Based on such understanding, the technical solutions of the present invention may be embodied in the form of a software product. The software product may be stored in a nonvolatile storage medium, for example a CD-ROM, a USB flash drive, or a removable hard disk, and include several instructions for instructing a computer device (may be a personal computer, a server, or a network device) to perform the method according to the embodiments of the present invention.

The technical solutions and beneficial effects of the present invention have been described in further detail through the foregoing specific embodiments. It should be understood that the foregoing descriptions are merely specific embodiments of the present invention, but not intended to limit the protection scope of the present invention.

What is claimed is:

1. A method for adjusting a cell wireless configuration parameter, comprising:
   obtaining, by a base station of an adjustment participating cell, system performance information of the adjustment participating cell and a peripheral cell of the adjustment participating cell under different wireless-configuration-related information; wherein an adjustment participating cell is a cell that participates in a parameter adjustment operation performed at a predetermined group of cells and
   adjusting, by the base station of the adjustment participating cell, a wireless configuration parameter of the adjustment participating cell according to the system performance information of the adjustment participating cell and the peripheral cell of the adjustment participating cell;
   wherein obtaining the system performance information comprises obtaining, by the adjustment participating cell, system performance information calculated by the peripheral cell using different wireless-configuration-related information of the peripheral cell of the adjustment participating cell,
and calculating, by using the information, and obtaining the system performance information of the adjustment participating cell and the peripheral cell of the adjustment participating cell under the different wireless-configuration-related information.

2. The method according to claim 1, wherein the information of the peripheral cell obtained by the adjustment participating cell comprises geographical information of the peripheral cell of the adjustment participating cell and wireless-configuration-related information of the peripheral cell of the adjustment participating cell, wherein the geographical information comprises station address information.

3. The method according to claim 1, wherein the adjusting the wireless configuration parameter of the adjustment participating cell according to the system performance information of the adjustment participating cell and the peripheral cell of the adjustment participating cell comprises: when the system performance information of the adjustment participating cell and the peripheral cell of the adjustment participating cell exceeds a set value after an operation, adjusting the wireless configuration parameter of the adjustment participating cell according to the current corresponding wireless-configuration-related information; or
   obtaining a wireless configuration parameter corresponding to maximum system performance by comparing the total system performance of all the adjustment participating cells and the peripheral cells of all the adjustment participating cells under the different wireless-configuration-related information of the different adjustment participating cells, and adjusting the wireless configuration parameter of the adjustment participating cell according to the wireless configuration parameter.

4. The method according to claim 3, wherein the operation comprises:
   adding a throughput rate of the adjustment participating cell and the peripheral cell of the adjustment participating cell under certain wireless-configuration-related information of the adjustment participating cell to throughput rates of the other adjustment participating cells and the peripheral cells of the other adjustment participating cells under certain wireless-configuration-related information of the other adjustment participating cells; or
   adding a capacity of the adjustment participating cell and the peripheral cell of the adjustment participating cell under certain wireless-configuration-related information of the adjustment participating cell to capacities of the other adjustment participating cells and the peripheral cells of the other adjustment participating cells under certain wireless-configuration-related information of the other adjustment participating cells; or
   adding a coverage area of the adjustment participating cell and the peripheral cell of the adjustment participating cell under certain wireless-configuration-related information of the adjustment participating cell to coverage areas of the other adjustment participating cells and the peripheral cells of the other adjustment participating cells under certain wireless-configuration-related information of the other adjustment participating cells.

5. The method according to claim 1, wherein the adjusting the wireless configuration parameter of the adjustment participating cell according to the system performance information of the adjustment participating cell and the peripheral cell of the adjustment participating cell comprises: when the system performance information of the adjustment participating cell and the peripheral cell of the adjustment participating cell exceeds a set value after an operation, adjusting the wireless configuration parameter of the adjustment participating cell according to the current corresponding wireless-configuration-related information; or
   obtaining wireless-configuration-related information corresponding to maximum system performance by comparing the total system performance information of the adjustment participating cells and the peripheral cells of the adjustment participating cells with the total system performance of the adjustment participating cells and the peripheral cells of the adjustment participating cells under the different wireless-configuration-related information of the adjustment participating cells, and adjusting the wireless configuration parameter of the adjustment participating cell according to the wireless-configuration-related information.

6. The method according to claim 5, wherein the operation comprises: adding a throughput rate of the adjustment participating cell to a throughput rate of the peripheral cell of the adjustment participating cell; or adding a capacity of the adjustment participating cell to a capacity of the peripheral cell of the adjustment participating cell; or adding a coverage area of the adjustment participating cell to a coverage area of the peripheral cell of the adjustment participating cell.

7. The method according to claim 1, wherein the system performance information comprises at least one piece of the following information: a throughput rate, a capacity, coverage, and Quality of Service (QoS), wherein the capacity comprises a channel capacity or a user capacity.

8. A method for adjusting a cell wireless configuration parameter, comprising:
   obtaining system performance information of an adjustment participating cell and a peripheral cell of the adjustment participating cell under different wireless-configuration-related information; wherein an adjustment participating cell is a cell that participates in a parameter adjustment operation performed at a predetermined group of cells and
   adjusting a wireless configuration parameter of the adjustment participating cell according to the system performance information of the adjustment participating cell and the peripheral cell of the adjustment participating cell;
   wherein obtaining the system performance information comprises calculating and obtaining the system performance information of the adjustment participating cell under the different wireless-configuration-related information, and receiving the system performance information of the peripheral cell calculated by the peripheral cell under the different wireless-configuration-related information of the corresponding adjustment participating cell; and
   wherein the calculating, by the peripheral cell, the system performance information of the peripheral cells under the different wireless-configuration-related information of the corresponding adjustment participating cell comprises: obtaining, by the peripheral cell, information of the corresponding adjustment participating cell, and calculating, by using the information, and obtaining the system performance information of the peripheral cell under the different wireless-configuration-related information of the corresponding adjustment participating cell.

9. The method according to claim 8, wherein the information of the adjustment participating cell comprises geographical information of the adjustment participating cell and current wireless-configuration-related information of the adjustment participating cell, wherein the geographical information comprises station address information.

10. The method according to claim 9, wherein the information of the adjustment participating cell further comprises history measurement information at each geographical location in the adjustment participating cell, wherein the history measurement information at each geographical location in the adjustment participating cell comprises path loss, or further comprises interference information and/or signal quality, wherein the geographical information further comprises a channel model and/or cell shape and size.

11. The method according to claim 8, wherein the information of the adjustment participating cell further comprises a wireless configuration number and/or a wireless configuration parameter of the adjustment participating cell needed for calculating the system performance, wherein the wireless configuration parameter comprises at least one piece of the following information: transmitting power of an antenna, antenna height, an antenna azimuth angle, and an antenna downtilt angle.

12. A method for adjusting a cell wireless configuration parameter, comprising:
   obtaining, by a base station of an adjustment participating cell, system performance information of the adjustment participating cell and a peripheral cell of the adjustment participating cell under different wireless-configuration-related information; wherein an adjustment participating cell is a cell that participates in a parameter adjustment operation performed at a predetermined group of cells and
   adjusting, by the base station of the adjustment participating cell, a wireless configuration parameter of the adjustment participating cell according to the system performance information of the adjustment participating cell and the peripheral cell of the adjustment participating cell;
   wherein obtaining the system performance information of the adjustment participating cell and the peripheral cell of the adjustment participating cell under the different wireless-configuration-related information comprises:
       calculating and obtaining the system performance information of the adjustment participating cell under the different wireless-configuration-related information; and
       receiving the system performance information of the peripheral cell calculated by the peripheral cell under the different wireless-configuration-related information of the corresponding adjustment participating cell; and
   wherein before the adjusting the wireless configuration parameter of the adjustment participating cell according to the system performance information of the adjustment participating cell and the peripheral cell of the adjustment participating cell, the method further comprises:
       exchanging the system performance information of the adjustment participating cell and the peripheral cell of the adjustment participating cell between the adjustment participating cell and another adjustment participating cell; or
       combining the system performance information of the adjustment participating cell and the peripheral cell of the adjustment participating cell into total system performance information, and exchanging the total system performance information between the adjustment participating cell and another adjustment participating cell.

13. The method according to claim 12, wherein when the system performance information of the peripheral cell under the different wireless-configuration-related information of the corresponding adjustment participating cell is transferred to the adjustment participating cell, the peripheral cell transfer a different wireless configuration number and/or different wireless configuration parameter, wherein the different wireless configuration number and/or different wireless configuration parameter correspond to the different system performance information, to the adjustment participating cell; and the wireless configuration parameter comprises at least one piece of the following information: transmitting power of an antenna, antenna height, an antenna azimuth angle, and an antenna downtilt angle.

14. The method according to claim 12, wherein before the adjusting the wireless configuration parameter of the adjustment participating cell according to the system performance information of the adjustment participating cell and the peripheral cell of the adjustment participating cell, the method further comprises: exchanging different wireless configuration numbers and/or different wireless configuration parameters, wherein the different wireless configuration numbers and/or different wireless configuration parameters correspond to the different system performance, between the adjustment participating cells, wherein the wireless configuration parameters comprise at least one piece of the following information: transmitting power of an antenna, antenna height, an antenna azimuth angle, and an antenna downtilt angle.

15. A base station, comprising:
an antenna;
an obtaining unit, configured to obtain system performance information of an adjustment participating cell and a peripheral cell of the adjustment participating cell under different wireless-configuration-related information; wherein an adjustment participating cell is a cell that participates in a parameter adjustment operation performed at a predetermined group of cells and
an adjusting unit, configured to adjust a wireless configuration parameter of the adjustment participating cell according to the system performance information of the adjustment participating cell and the peripheral cell of the adjustment participating cell; and
an exchanging unit, configured to exchange the system performance information of the adjustment participating cell and the peripheral cell of the adjustment participating cell between the adjustment participating cell and another adjustment participating cell, wherein system performance information is obtained by calculating the system performance information of the adjustment participating cell and the peripheral cell of the adjustment participating cell under the different wireless-configuration-related information.

16. The base station according to claim 15, wherein the adjusting unit is further configured to perform an operation on the system performance information of the adjustment participating cell and the system performance information of the peripheral cells of the adjustment participating cell, and when total system performance of all the adjustment participating cells and the peripheral cells of all the adjustment participating cells exceeds a set value, adjust the wireless configuration parameter of the adjustment participating cell according to the current corresponding wireless-configuration-related information; or obtain wireless-configuration-related information corresponding to maximum system performance by comparing the total system performance of all the adjustment participating cells and the peripheral cells of all the adjustment participating cells under the different wireless-configuration-related information, and adjust the wireless configuration parameter of the adjustment participating cell according to the wireless-configuration-related information.

17. The base station according to claim 15, further comprising a calculating unit, configured to calculate the system performance information of the adjustment participating cell and the peripheral cell of the adjustment participating cell under the different wireless-configuration-related information according to the received information of the peripheral cell.

* * * * *